United States Patent
Kojima et al.

(10) Patent No.: US 10,518,683 B2
(45) Date of Patent: Dec. 31, 2019

(54) VEHICLE SEAT

(71) Applicant: TOYOTA BOSHOKU KABUSHIKI KAISHA, Aichi (JP)

(72) Inventors: Teruhiko Kojima, Aichi (JP); Hirotaka Torikai, Aichi (JP); Takuya Fujimura, Aichi (JP); Kenji Iida, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 4 days.

(21) Appl. No.: 15/962,369

(22) Filed: Apr. 25, 2018

(65) Prior Publication Data

US 2018/0339626 A1 Nov. 29, 2018

(30) Foreign Application Priority Data

May 23, 2017 (JP) ................. 2017-101722

(51) Int. Cl.
*B60N 2/90* (2018.01)
*B60N 2/02* (2006.01)

(52) U.S. Cl.
CPC ............. *B60N 2/914* (2018.02); *B60N 2/99* (2018.02); *B60N 2/0228* (2013.01); *B60N 2002/026* (2013.01)

(58) Field of Classification Search
CPC ......... B60N 2/914; B60N 2/99; B60N 2/0228
USPC .......................................... 701/45
See application file for complete search history.

(56) References Cited

U.S. PATENT DOCUMENTS

| 5,321,617 | A | * | 6/1994 | Mori | B60N 2/0244 296/65.16 |
|---|---|---|---|---|---|
| 6,273,810 | B1 | * | 8/2001 | Rhodes, Jr. | A47C 4/54 454/120 |
| 9,211,824 | B2 | * | 12/2015 | Arant | B60N 2/62 |
| 2010/0207443 | A1 | * | 8/2010 | Brncick | B60N 2/686 297/452.48 |
| 2017/0158088 | A1 | * | 6/2017 | Pike | B60N 2/646 |
| 2017/0253252 | A1 | * | 9/2017 | Donnelly | B60W 50/0098 |

FOREIGN PATENT DOCUMENTS

| JP | 2004-042792 | | 2/2004 |
|---|---|---|---|
| KR | 20160036934 A | * | 4/2016 |

* cited by examiner

*Primary Examiner* — Genna M Mott
*Assistant Examiner* — Melanie J Patrick
(74) *Attorney, Agent, or Firm* — Greenblum & Bernstein, P.L.C.

(57) ABSTRACT

A vehicle seat includes an air bag, and a controller. The air bag is for holding a posture of an occupant and configured to inflate as air flows in or deflate as air flows out of the air bag. The controller is configured to receive an input of a signal based on a steering angle of the vehicle and to control inflation or deflation of the air bag based on the signal. The controller is configured to enable an active-support mode to cause air to flow inside the air bag in response to the steering angle becoming greater than or equal to a predefined given angle.

6 Claims, 4 Drawing Sheets

VEHICLE SEAT

CROSS-REFERENCE TO RELATED APPLICATIONS

This application claims the benefit of Japanese Patent Application No. 2017-101722 filed May 23, 2017 in the Japan Patent Office, the entire disclosure of which is incorporated herein by reference.

BACKGROUND

The present disclosure relates to a vehicle seat for a vehicle.

For example, Japanese Unexamined Patent Application Publication No. 2004-042792 discloses a vehicle seat including a lower-back support frame and a side support frame each configured to be slid and displaced by a hydraulic cylinder. Each hydraulic cylinder holds the support frame at positions such as a curve-mode position and a driving-mode position. In the curve-mode position, the posture of an occupant can be held with a holding force greater than that in the driving-mode position.

A controller for controlling operation of each hydraulic cylinder calculates a turning acceleration (a centripetal acceleration) using a curve radius (calculated from a steering angle and a speed of the vehicle), and determines whether a position should be a curve-mode position based on the turning acceleration.

SUMMARY

A supporting mechanism for holding the posture of an occupant with hydraulic equipment such as a hydraulic cylinder requires a pipe arrangement for hydraulic fluid to travel from the hydraulic equipment back to a hydraulic pump as well as a countermeasure against leakage of the hydraulic fluid. This is likely to cause a significantly complicated vehicle seat configuration.

Preferably, one aspect of the present disclosure provides substantially the same functions as the vehicle seat disclosed in Japanese Unexamined Patent Application Publication No. 2004-042792 with a simple configuration.

One mode of the present disclosure provides a vehicle seat for a vehicle. The vehicle seat comprises an air bag, and a controller. The air bag is for holding a posture of an occupant. The air bag is configured to inflate as air flows in or deflate as air flows out of the air bag. The controller is configured to receive an input of a signal based on a steering angle of the vehicle and to control inflation or deflation of the air bag based on the signal. The controller is configured to enable an active-support mode to cause the air to flow inside the air bag in response to the steering angle becoming greater than or equal to a predefined given angle.

The vehicle seat holds the posture of the occupant by using the air bag that inflates as the air flows in or deflates as the air flows out of the air bag. This enables elimination of a pipe arrangement for recovering the air back, for example, to an air pump and also reduces a need for a countermeasure against leakage of the air.

Since the air is pumped inside the air bag when the steering angle is greater than or equal to the given angle, substantially the same functions as the vehicle seat disclosed in Japanese Unexamined Patent Application Publication No. 2004-042792 can be obtained with a simple configuration.

In one mode of the present disclosure, the controller may be configured to cause air to flow out of the air bag in response to the steering angle continuing to be less than the predefined given angle for a predefined period of time. Such a vehicle seat may help to reduce unnecessary continuance of the active-support mode.

In one mode of the present disclosure, the vehicle seat comprises a surge tank configured to reserve air that is compressed to a pressure greater than or equal to a predefined pressure, and a valve configured to control communication between the surge tank and the air bag. The controller may open the valve to cause the air to flow inside the air bag when the active-support mode is enabled.

Such a vehicle seat may enable the air bag to be supplied with air in a short period of time, and therefore, may promptly exert a strong holding force when required. If the vehicle seat has no surge tank, it is difficult to supply air into the air bag in a short period of time when the steering angle is greater than or equal to the given angle.

In another mode of the present disclosure, a vehicle seat comprises an air bag, a surge tank, a valve, and a controller. The air bag is for holding a posture of an occupant and configured to inflate as air flows in or deflate as air flows out of the air bag. The surge tank is configured to reserve air that is compressed to a pressure greater than or equal to a predefined pressure. The valve is configured to control communication between the surge tank and the air bag. The controller is configured to control inflation or deflation of the air bag and for enabling an active-support mode for opening the valve to cause air to flow inside the air bag.

In one mode of the present disclosure, the air bag comprises a first inflation chamber, and a second inflation chamber that is located closer to the center of the vehicle seat along a width of the vehicle seat than the first inflation chamber is. The controller may cause air to flow inside the second inflation chamber when the active-support mode is enabled. Such a vehicle seat may enable the air bag to be supplied with air in a short period of time compared with an air bag that comprises a single inflation chamber.

In one mode of the present disclosure, a volume of the second inflation chamber at inflation may be smaller than a volume of the first inflation chamber at inflation. Such a vehicle seat may enable air supply in a short period of time more confidently (react more quickly to accelerations).

BRIEF DESCRIPTION OF THE DRAWINGS

An embodiment of the present disclosure will be described hereinafter by way of example with reference to the accompanying drawings, in which.

DETAILED DESCRIPTION OF THE PREFERRED EMBODIMENTS

An "embodiment" explained hereinafter shows one example of embodiments that belong to the technical scope of the present disclosure. In other words, matters to specify the invention recited in the claims are not limited to specific configurations or structures that are shown in the embodiments explained hereinafter.

Arrows and other marks that indicate directions on each drawings are made for easy understanding of relationship between each drawing. Arrows and other marks (directions) labelled on each drawing do not limit the scope of the present disclosure.

Embodiment

1. Outline of Vehicle Seat

Figure 1:
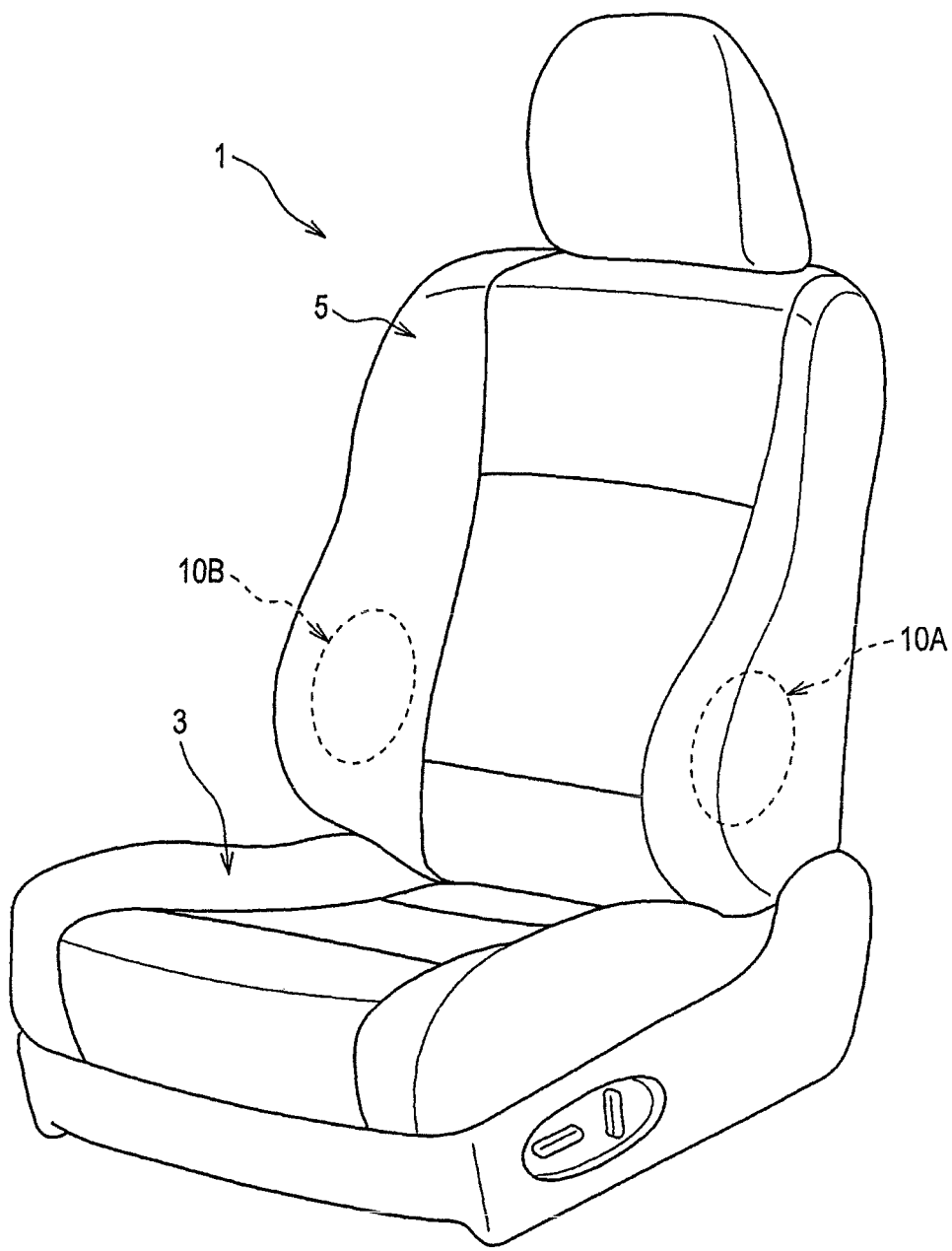
FIG. 1 is a diagram showing a vehicle seat according to an embodiment.

As shown in FIG. 1, a vehicle seat 1 (seat) comprises at least a seat cushion 3, and a seatback 5.

The seat cushion 3 supports the buttocks of an occupant. The seatback 5 supports the back of the occupant. A side-support 10 is assembled in each end (width-end) of the seatback 5 along a width of the vehicle seat 1 (a left side-support 10A is located in the left side of the seatback, and a right-side support 10B is located in the right side of the seatback). Together, these are side supports 10. The width of the vehicle seat 1 is along a right-left axis with reference to the occupant.

2. Side-Support 2.1 Arrangement and Configuration of Air Bag

The side-supports 10 enhance tight-fittedness of the vehicle seat 1 to the occupant to hold the posture of the occupant. The side-supports 10 in each width-end of the seat tightly fit to the occupant to hold the posture of the occupant.

Figure 2:
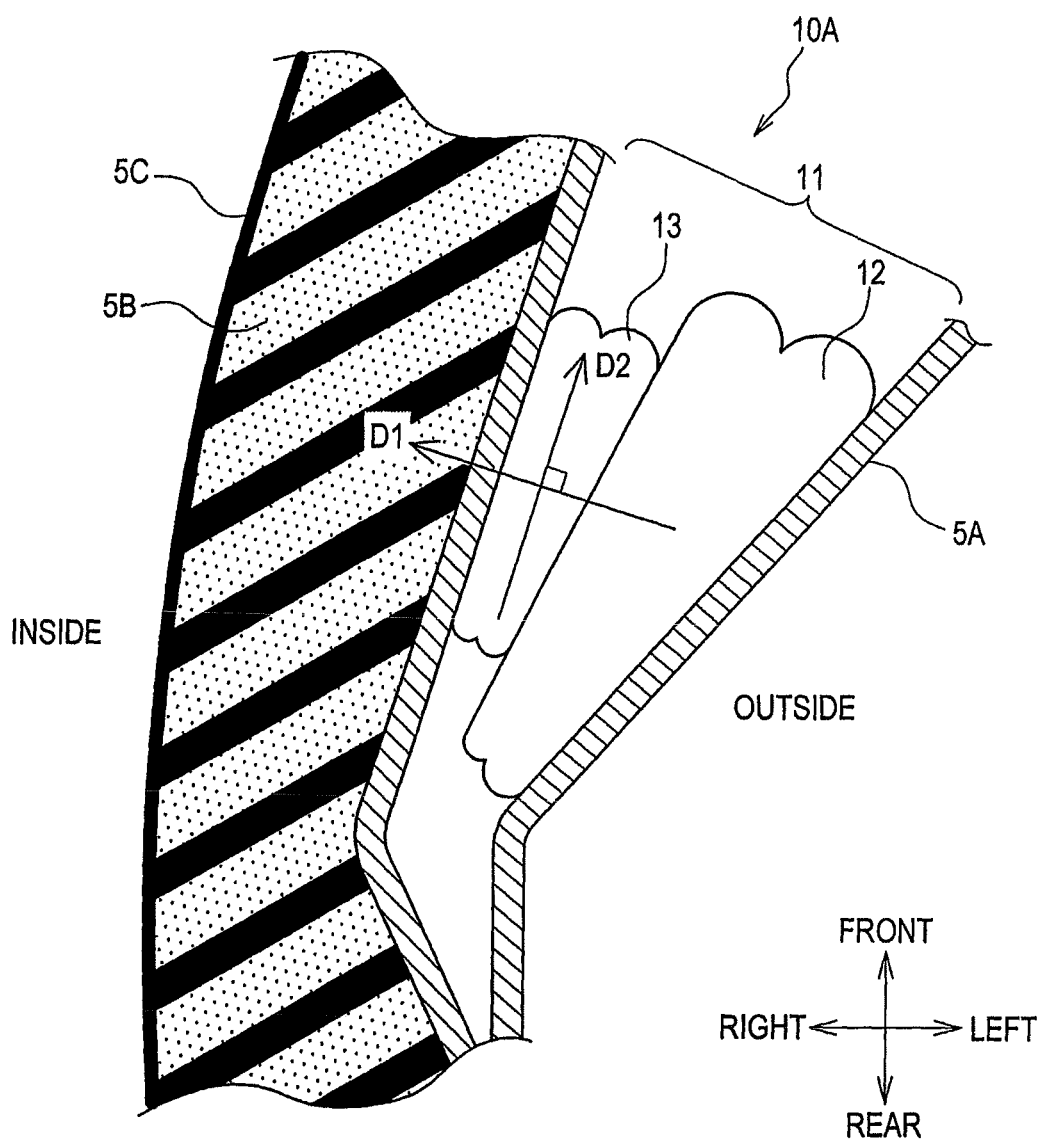
FIG. 2 is a diagram showing a configuration of a side-support according to the embodiment.

As shown in FIG. 2, the left side-support 10A comprises at least an air bag 11; and so does the right side-support 10B. The air bag 11 is a bag body that inflates as air flows in or deflates (being contracted) as air flows out of the air bag. A surface of the vehicle seat is closely fixed to the occupant by inflation of the air bag 11 to hold the posture of the occupant.

The air bag 11 according to the present embodiment comprises at least a first inflation chamber 12, and a second inflation chamber 13. The first inflation chamber 12 and the second inflation chamber 13 inflates when the air flows in (charges) and deflates when the air inside the chambers flows out (discharges).

The air bag 11, in other words, the first inflation chamber 12 and the second inflation chamber 13, is located between a back frame 5A and a back pad 5B. The back frame 5A is a frame of the seatback 5. The back pad 5B is a buffer made of an elastic foam such as urethane.

A surface of the back pad 5B is covered with an outer cover 5C. The outer cover 5C directly touches the occupant. The second inflation chamber 13 is located closer to the outer cover 5C than the first inflation chamber 12 is. Being closer to the outer cover 5C is the same as being closer to the center of the vehicle seat along the width of the vehicle seat. A volume of the second inflation chamber 13 is designed to be smaller at inflation than a volume of the first inflation chamber 12 at inflation.

In addition, the second inflation chamber 13 is configured so that its inflation towards the outer cover 5C (in a direction D1) is greater than its inflation in other direction (for example, in a direction D2) when it inflates by a supply of the air.

More specifically, for example, the second inflation chamber 13 is configured so that its elastic modulus with respect to the directions D1 is smaller than its elastic modulus with respect to the direction D2. The second inflation chamber 13 accordingly inflates greater in the direction D1 than in the direction D2 when the air is supplied.

2.2 Air Supply System

Figure 3:
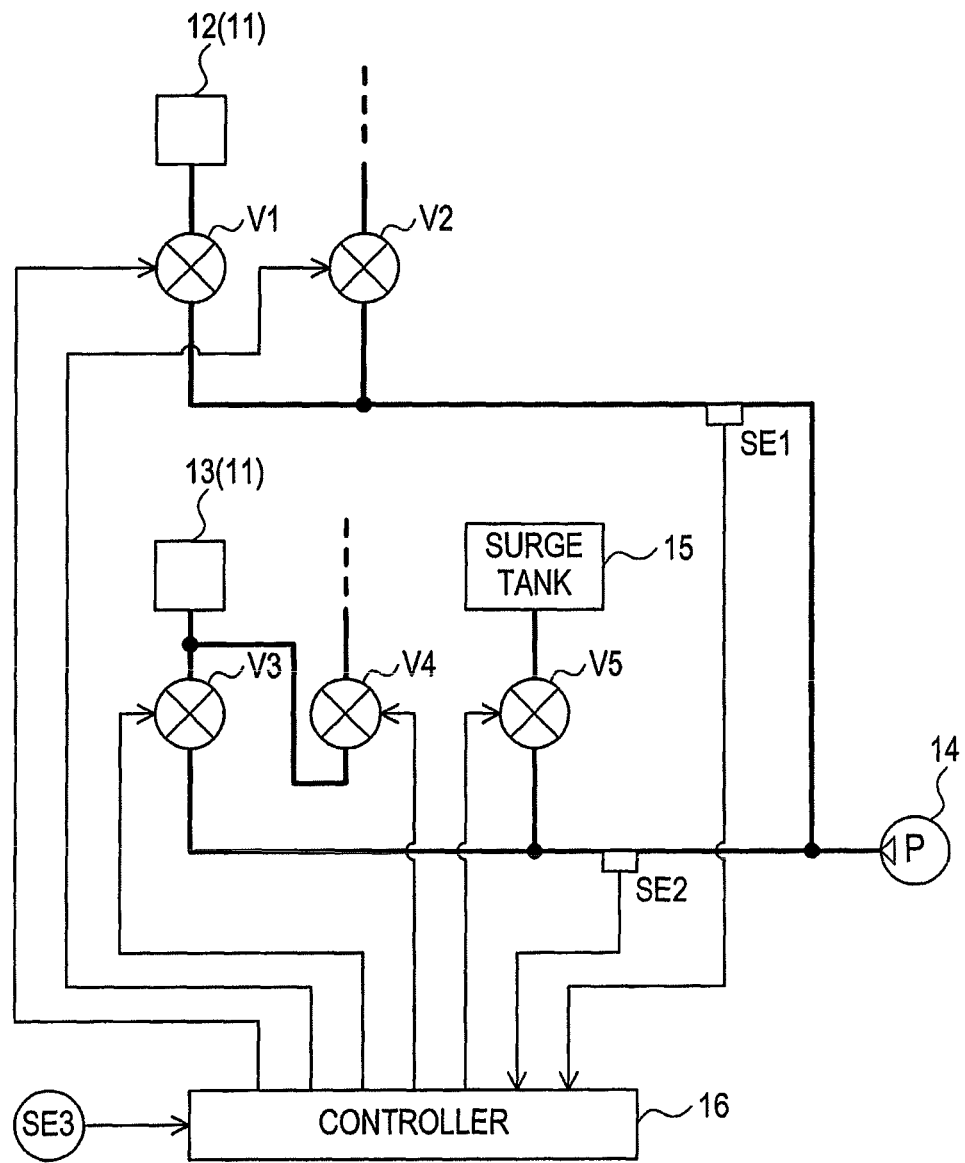
FIG. 3 is a diagram showing a configuration of a pipe arrangement in the side-support according to the embodiment.

As shown in FIG. 3, each side-support 10 comprises an air pump 14, a surge tank 15, five ON-OFF valves V1 to V5, and pipe arrangements for coupling these components, as well as a controller 16. The pipe arrangement according to the present embodiment comprises flexible tubes.

The air pump 14 discharges air that is compressed to a pressure greater than or equal to atmospheric pressure. The surge tank 15 is a pressure reservoir for air that is compressed to a pressure greater than or equal to a predefined pressure (hereinafter referred to as the compressed air).

The ON-OFF valves V1 to V5 are two-way valves. In addition, the ON-OFF valves V1 to V5 are normally-closed solenoid valves that are closed in a de-energized state. In other words, the ON-OFF valves V1 to V5 (first through fifth valves) are open (ON) only when the controller 16 issues an energizing command, and are closed (OFF) when the controller 16 is not issuing the energizing command.

The first valve V1 comprises a first end communicating with an air inlet/outlet of the first inflation chamber 12, and a second end communicating with a discharge outlet of the air pump 14. The second valve V2 comprises a first end communicating with atmosphere, and a second end coupled with the pipe arrangement leading to the first inflation chamber 12.

The third valve V3 comprises a first end communicating with an air inlet/outlet of the second inflation chamber 13, and a second end communicating with the discharge outlet of the air pump 14. The fourth valve V4 comprises a first end communicated with atmosphere, and a second end coupled with the pipe arrangement leading to the second inflation chamber 13.

The fifth valve V5 comprises a first end communicating with an air inlet/outlet of the surge tank 15, and a second end communicating with the discharge outlet of the air pump 14. The controller 16 controls open-close operation of each of the ON-OFF valves V1 to V5, and also controls start and stop of the operation of the air pump 14.

The controller 16 comprises a microcomputer that includes a CPU, a ROM, and a RAM. A program to control operation of each of the ON-OFF valves V1 to V5 and the air pump 14 is prerecorded in non-volatile storage, such as the ROM.

A first pressure-sensor SE1 detects the pressure of air supplied to the first inflation chamber 12. A second pressure-sensor SE2 detects the pressure of air supplied to the second inflation chamber 13. Detection signals from the first pressure-sensor SE1 and the second pressure-sensor SE2 are received by the controller 16 as inputs.

3. Operation of Side-Support 3.1 Outline of Operation of Side-Support

The controller 16 comprises at least a "normal-support mode" and an "active-support mode" as operable operation-control modes for each of the ON-OFF valves V1 to V5 and the air pump 14.

<Normal-Support Mode>

The normal-support mode is an operation-control mode that allows "manual" inflation or deflation of the first inflation chamber 12 by the occupant through manipulation of an operation switch (not shown) of the side-support 10.

More specifically, the controller 16 opens the first valve V1 and activates the air pump 14 in response to manipulation by the occupant to inflate the first inflation chamber 12. The first inflation chamber 12 inflates accordingly and helps to enhance the tight-fit of the vehicle seat 1 to the occupant.

In this normal-support mode, the controller 16 opens the second valve V2 and stops the air pump 14 when the pressure detected by the first pressure-sensor SE1 is greater than or equal to the predefined pressure. This reduces an excessive inflation of the first inflation chamber 12.

The controller 16 opens the first and second valves V1 and V2 in response to manipulation by the occupant to deflate the first inflation chamber 12. Accordingly, the air inside the first inflation chamber 12 is discharged and the first inflation chamber 12 deflates, which then reduces the tight-fit of the vehicle seat 1 to the occupant.

<Active-Support Mode>

The active-support mode is an operation-control mode that is enabled by being selected by the occupant. In the active-support mode, the controller 16 estimates inertial forces acting on the occupant (for example, a centrifugal force) and inflates or deflates the second inflation chamber 13 based on the estimate.

More specifically, the controller 16 has an input of a signal based on a steering angle of a vehicle. The signal is an output from a steering angle sensor SE3 that is located in a steering device (not shown) of the vehicle.

The controller 16 opens the third and fifth valves V3 and V5 when it is determined, based on the aforementioned signal, that the steering angle of the vehicle is greater than or equal to a predefined given angle (hereinafter referred to as the first given angle $\theta 1$). This causes the compressed air reserved in the surge tank 15 to be supplied into the second inflation chamber 13, which consequently causes inflation of the second inflation chamber 13.

The controller 16 closes at least the third valve V3 in response to an elapse of a predefined period of time since the third and fifth valves V3 and V5 were opened, or in response to a pressure in the second inflation chamber 13 (in the present embodiment, a pressure detected by the second pressure-sensor SE2) becoming greater than or equal to the predefined pressure since the supply of the reserve air started.

The controller 16 activates the air pump 14 and replenishes the compressed air into the surge tank 15 when the supply of the compressed air to the second inflation chamber 13 is finished, in other words, when the opened third valve V3 is closed.

The controller 16 then stops the air pump 14 and closes the fifth valve V5 in response to a pressure in the surge tank 15 (in the present embodiment, a pressure detected by the second pressure-sensor SE2) becoming greater than or equal to the predefined pressure.

The controller 16 opens the fourth valve V4 in response to the steering angle continuing to be less than a predefined given angle (hereinafter referred to as the second given angle $\theta 2$) for a predefined period of time. This causes the air in the second inflation chamber 13 to be discharged, which consequently causes deflation of the second inflation chamber 13.

The controller 16 closes the fourth valve V4 in response to the pressure in the second inflation chamber 13 (in the present embodiment, a pressure detected by the second pressure-sensor SE2) becoming less than or equal to the predefined pressure, or in response to an elapse of a predefined period of time since the fourth valve V4 was opened.

The first given angle $\theta 1$ and the second given angle $\theta 2$ may be the same angle or may be different angles. In the present embodiment, the second given angle $\theta 2$ is smaller than the first given angle $\theta 1$. In the present embodiment, the first given angle $\theta 1$ is 30 degrees and the second given angle $\theta 2$ is 15 degrees.

3.2 Detailed Operation of Side-Support

Figure 4:
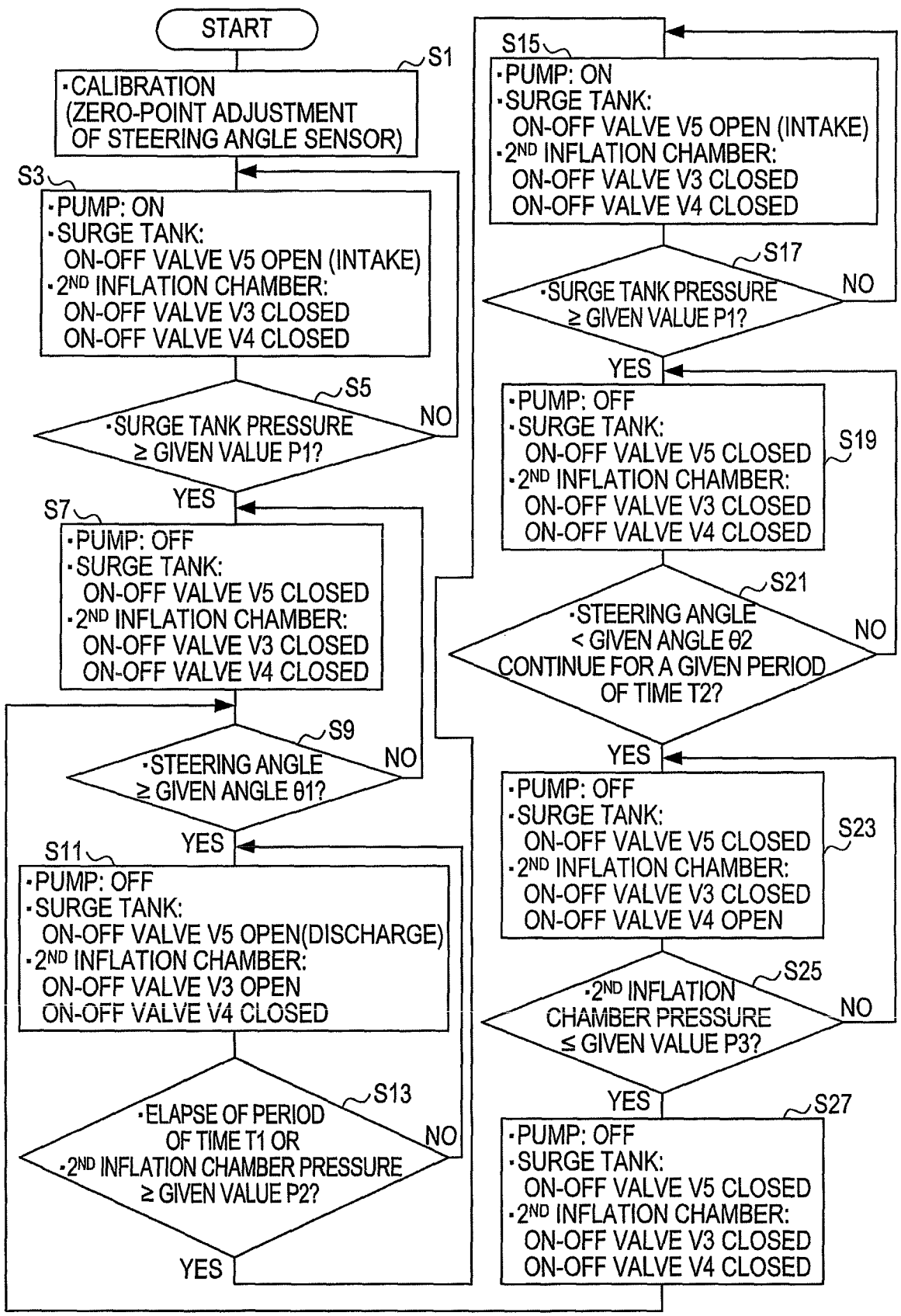
FIG. 4 is a flowchart showing operation of the side-support according to the embodiment.

The flowchart in FIG. 4 shows an example of an operation-control mode that is enabled when the active-support mode is selected by the occupant. A program to enable the active-support mode is stored in a non-volatile storage such as the ROM.

The controller 16 (CPU) reads and executes the program when the occupant selects the active-support mode. In response to the activation of the program, the controller 16 executes zero-point adjustment (calibration) of the steering angle sensor SE3 (S1).

The controller 16 then opens the fifth valve V5 and activates the air pump 14 to fill the surge tank 15 with the compressed air (S3). In response to the pressure in the surge tank 15 (in the present embodiment, a pressure detected by the second pressure-sensor SE2) becoming greater than or equal to a predefined given pressure P1 (S5: YES), the controller 16 closes the fifth valve V5 and stops the air pump 14 to stop filling the surge tank 15 with the compressed air (S7).

The controller 16 then determines whether the steering angle of the vehicle is greater than or equal to the first given angle $\theta 1$ (S9). If it is determined that the steering angle is not greater than or equal to the first given angle $\theta 1$ (S9: NO), operation of the controller 16 remains the same (the process goes back to S7). In other words, steps S7 and S9 loop until the steering angle is ≥the first given angle $\theta 1$, and then step S11 begins.

If it is determined that the steering angle is greater than or equal to the first given angle $\theta 1$ (S9: YES), then the controller 16 opens the third and fifth valves V3 and V5 (S11). The controller 16 then determines whether a predefined period of time T1 has elapsed since the third and fifth valves V3 and V5 were opened or whether the pressure in the second inflation chamber 13 becomes greater than or equal to a predefined given pressure P2 since the supply of the reserve air started (S13).

If it is determined that none of the aforementioned conditions are satisfied (S13: NO), operation of the controller 16 remains the same (the process goes back to S11). If it is determined that any one of the aforementioned conditions is satisfied (S13: YES), then the controller 16 closes the third valve V3, leaves the fifth valve V5 open, and activates the air pump 14 (S15).

The controller 16 then determines whether the pressure in the surge tank 15 is greater than or equal to the predefined given pressure P1 (S17). The controller 16 stops the air pump 14 and closes the fifth valve V5 (S19) in response to the pressure in the surge tank 15 becoming greater than or equal to the aforementioned first given pressure P1.

The controller 16 then determines whether the steering angle has continued to be less than the second given angle $\theta 2$ for a predefined period of time T2 or longer (S21). If it is determined that this condition is not satisfied (S21: NO), operation of the controller 16 remains the same (the process goes back to S19).

If it is determined that the condition is satisfied (S21: YES), then the controller 16 opens the fourth valve V4 (S23). The controller 16 then determines whether the pressure in the second inflation chamber 13 is less than or equal to a predefined given pressure P3 (S25).

If it is determined that the pressure in the second inflation chamber 13 is not less than or equal to the predefined given pressure P3 (S25: NO), then operation of the controller 16 remains the same (the process goes back to S23). If it is determined that the pressure in the second inflation chamber 13 is less than or equal to the predefined given pressure P3 (S25: YES), then the controller 16 closes the fourth valve V4 (S27).

4. Features of Vehicle Seat in the Present Embodiment

The vehicle seat 1 holds the posture of the occupant by using the air bag 11, which inflates as the air flows in or deflates as the air flows out of the air bag. This enables elimination of a pipe arrangement for recovering the air back to the air pump 14 and also reduces a need for a countermeasure against leakage of the air.

Since the air is charged into the second inflation chamber 13 when the steering angle is greater than or equal to the first given angle $\theta 1$, substantially the same functions as the vehicle seat disclosed in Japanese Unexamined Patent Application Publication No. 2004-042792 can be provided with a more simple configuration.

The controller 16 causes the air to flow out of the second inflation chamber 13 when the steering angle has continued to be less than the second given angle $\theta 2$ for the predefined period of time T2 or longer. This helps to reduce unnecessary continuance of the active-support mode.

When the active-support mode is enabled, the controller 16 causes the compressed air reserved in the surge tank 15 to flow into the second inflation chamber 13. This helps to supply the air into the air bag 11 in a short period of time.

As a result, a strong holding force can be promptly exerted when required, such as when a large inertial force acts on the occupant. If there is no surge tank 15, it would be difficult to supply the air into the second inflation chamber 13 in a short period of time when the steering angle is greater than or equal to the first given angle $\theta 1$.

To be more specific, it is difficult to obtain enough compressed air to quickly enable the active-support mode since a discharge pressure of the air pump 14 is low for several seconds after activation of the air pump 14. It is therefore conventionally impossible to promptly enable the active-support mode after the air pump 14 is activated in response to the steering angle becoming greater than or equal to the first given value $\theta 1$.

Meanwhile, in the present embodiment, the surge tank 15 has enough reserve of the compressed air to promptly enable the active-support mode. A strong holding force can be promptly exerted (by the second inflation chamber) when required, such as when a large inertial force acts on the occupant.

The controller 16 causes the air to flow into the second inflation chamber 13 when the active-support mode is enabled. This enables the air bag 11 to be supplied with the air in a short period of time compared with an air bag 11 that comprises only a single inflation chamber.

The volume of the second inflation chamber 13 at inflation is smaller than the volume of the first inflation chamber 12 at inflation. This enables air supply (inflation of the second inflation chamber 13) in a short period of time more confidently. The first valve V1 may be called a first inflation chamber valve. The second valve V2 may be called a first atmosphere vent valve. The third valve V3 may be called a second inflation chamber valve. The fourth valve V4 may be called a second atmosphere vent valve (and may be directly connected to second inflation chamber, as shown in FIG. 3). The fifth valve V5 may be called a surge valve.

Other Embodiments

The ON-OFF valves V1 to V5 according to the aforementioned embodiment are preferably normally-closed solenoid two-way valves. The valves may nevertheless be solenoid three-way valves with the third and fourth valves V3 and V4 integrated, for example.

The controller 16 according to the aforementioned embodiment is configured to replenish the surge tank 15 with the compressed air after supplying the second inflation chamber 13 with the compressed air. The controller 16 may nevertheless be configured, for example, to enable independent and parallel execution of an operation control for replenishing the surge tank 15 with the compressed air and an operation control for supplying the second inflation chamber 13 with the compressed air. In other words, the controller 16 may be configured to simultaneously enable the operation control for supplying the second inflation chamber 13 with the compressed air and steps S3 to S7 and S15 to S19.

When the second inflation chamber 13 needs to be supplied with the compressed air, the controller 16 may be configured to stop supplying the second inflation chamber 13 with the compressed air if the pressure in the surge tank 15 is too low; alternatively, the controller 16 may be configured to start supplying the second inflation chamber 13 with the compressed air in response to an increase in the pressure in the surge tank 15.

In the aforementioned embodiment, the air bag 11 comprises the first inflation chamber 12, and the second inflation chamber 13. Nevertheless, the air bag 11 may comprise, for example, a single inflation chamber, or three or more inflation chambers.

In the aforementioned embodiment, the volume of the second inflation chamber 13 at inflation is preferably smaller than the volume of the first inflation chamber 12 at inflation. The volume of the second inflation chamber 13 at inflation may nevertheless be, for example, greater than or equal to the volume of the first inflation chamber 12 at inflation.

In the aforementioned embodiment, the second inflation chamber 13 is preferably located closer to the outer cover 5C than the first inflation chamber 12 is. The first inflation chamber 12 may nevertheless be located closer to the outer cover 5C than the second inflation chamber 13 is, for example.

In the aforementioned embodiment, the compressed air is let inside the air bag 11 (the second inflation chamber 13) when the steering angle is greater than or equal to the first given angle $\theta 1$. The vehicle seat may nevertheless be, for example, configured with a manual switch on the steering for causing the compressed air to flow inside the air bag 11 (the second inflation chamber 13) of the seat, on which the occupant who manipulated the manual switch is seated, only when the switch is manipulated for a given period of time.

In the aforementioned embodiment, the reserve air is supplied from the surge tank 15 to the second inflation chamber 13. Nevertheless, the surge tank 15 may be eliminated and the air pump 14 may be activated so that the compressed air is supplied directly from the air pump 14 to the second inflation chamber 13, for example.

In the aforementioned embodiments, a vehicle seat of a passenger car is used as an example of the vehicle seat 1. Nevertheless, the vehicle seat 1 should not be limited to a seat of a passenger car. The vehicle seat 1 may be a seat used in vehicles such as railway vehicles, vessels, and aircrafts, as well as a built-in seat used in theaters and homes.

The present disclosure is not limited to the aforementioned embodiments as long as it falls within the spirit of the invention described in the claims. Accordingly, the present disclosure may be configured in combination of at least two of the aforementioned embodiments.

What is claimed is:

1. A vehicle seat for a vehicle comprising:
an air bag for holding a posture of an occupant and configured to:
inflate as air flows into the air bag; and
deflate as air flows out of the air bag;
a controller configured to:
receive an input of a first signal based on a steering angle of the vehicle,
control inflation or deflation of the air bag based on the first signal,
enable an active-support mode to cause air to flow into the air bag in response to the steering angle becoming greater than or equal to a first given angle, and
cause air to flow out of the air bag in response to the steering angle continuing to be less than a second given angle for a predefined period of time,
wherein the air bag comprises a first inflation chamber, and a second inflation chamber that is located closer to a center of the vehicle seat along a width of the vehicle seat than the first inflation chamber is; and
wherein the controller causes air to flow into the second inflation chamber when the active-support mode is enabled.

2. The vehicle seat according to claim 1, further comprising:
a surge tank configured to reserve air that is compressed to a pressure greater than or equal to a first predefined pressure; and
a valve configured to control communication between the surge tank and the air bag, wherein the controller opens the valve to cause air to flow into the air bag when the active-support mode is enabled.

3. The vehicle seat according to claim 1, wherein a volume of the second inflation chamber at inflation is smaller than a volume of the first inflation chamber at inflation.

4. The vehicle seat according to claim 1, further comprising:
a pad,
wherein the second inflation chamber is disposed so as to be interposed between the first inflation chamber and the pad in a thickness direction of the pad.

5. A vehicle seat for a vehicle comprising:
an air bag for holding a posture of an occupant and configured to:
inflate as air flows into the air bag; and
deflate as air flows out of the air bag;
a surge tank configured to reserve air that is compressed to a pressure greater than or equal to a first predefined pressure;
a valve configured to control communication between the surge tank and the air bag; and
a controller configured to control inflation or deflation of the air bag and to enable an active-support mode for opening the valve to cause air to flow into the air bag, and cause air to flow out of the air bag in response to the steering angle continuing to be less than a second given angle for a predefined period of time,
wherein the air bag comprises a first inflation chamber, and a second inflation chamber that is located closer to a center of the vehicle seat along a width of the vehicle seat than the first inflation chamber is; and
wherein the controller causes air to flow into the second inflation chamber when the active-support mode is enabled.

6. The vehicle seat according to claim 5, further comprising:
a pad,
wherein the second inflation chamber is disposed so as to be interposed between the first inflation chamber and the pad in a thickness direction of the pad.

* * * * *